(12) United States Patent
Langton et al.

(10) Patent No.: US 9,646,159 B2
(45) Date of Patent: May 9, 2017

(54) MULTI-FILE MALWARE ANALYSIS

(71) Applicant: Juniper Networks, Inc., Sunnyvale, CA (US)

(72) Inventors: Jacob Asher Langton, Oakland, CA (US); Daniel J. Quinlan, San Francisco, CA (US); Kyle Adams, Brisbane, CA (US); Declan Conlon, Sydney (AU)

(73) Assignee: Juniper Networks, Inc., Sunnyvale, CA (US)

( * ) Notice: Subject to any disclaimer, the term of this patent is extended or adjusted under 35 U.S.C. 154(b) by 14 days.

(21) Appl. No.: 14/675,460

(22) Filed: Mar. 31, 2015

(65) Prior Publication Data

US 2016/0292419 A1 Oct. 6, 2016

(51) Int. Cl.
*G06F 21/56* (2013.01)
*G06F 21/53* (2013.01)

(52) U.S. Cl.
CPC .......... *G06F 21/566* (2013.01); *G06F 21/53* (2013.01); *G06F 21/567* (2013.01); *G06F 2221/034* (2013.01)

(58) Field of Classification Search
CPC ...... G06F 21/566; G06F 21/53; G06F 21/567; G06F 2221/034
See application file for complete search history.

(56) References Cited

U.S. PATENT DOCUMENTS

| | | | |
|---|---|---|---|
| 7,908,653 B2 * | 3/2011 | Brickell | G06F 21/51 709/215 |
| 8,146,151 B2 * | 3/2012 | Hulten | G06F 21/51 726/16 |
| 8,266,698 B1 * | 9/2012 | Seshardi | G06F 21/53 726/22 |
| 8,621,233 B1 * | 12/2013 | Manadhata | G06F 21/56 709/224 |
| 8,635,700 B2 * | 1/2014 | Richard | G06F 21/562 370/474 |
| 8,850,572 B2 * | 9/2014 | Paterson | G06F 21/53 726/22 |

(Continued)

OTHER PUBLICATIONS

Extended Search Report for Corresponding European Application No. 15187112.6 mailed Mar. 11, 2016, 7 pages.

*Primary Examiner* — Jung Kim
*Assistant Examiner* — James J Wilcox
(74) *Attorney, Agent, or Firm* — Harrity & Harrity, LLP

(57) ABSTRACT

A device may identify a plurality of files for a multi-file malware analysis. The device may execute the plurality of files in a malware testing environment. The device may monitor the malware testing environment for behavior indicative of malware. The device may detect the behavior indicative of malware. The device may perform a first multi-file malware analysis or a second multi-file malware analysis based on detecting the behavior indicative of malware. The first multi-file malware analysis may include a partitioning technique that partitions the plurality of files into two or more segments of files to identify a file, included in the plurality of files, that includes malware. The second multi-file malware analysis may include a scoring technique that modifies a plurality of malware scores, corresponding to the plurality of files, to identify the file, included in the plurality of files, that includes malware.

20 Claims, 13 Drawing Sheets

(56) References Cited

U.S. PATENT DOCUMENTS

| | | | |
|---|---|---|---|
| 9,071,636 B2* | 6/2015 | Raman | H04L 63/1416 |
| 9,213,837 B2* | 12/2015 | Richard | G06F 21/562 |
| 9,313,222 B2* | 4/2016 | Huang | H04L 63/1433 |
| 9,323,928 B2* | 4/2016 | Agarwal | G06F 21/55 |
| 9,390,266 B1* | 7/2016 | Zakorzhevsky | G06F 21/561 |
| 9,485,272 B1* | 11/2016 | Roundy | H04L 63/145 |
| 2004/0210769 A1* | 10/2004 | Radatti | G06F 21/566 726/25 |
| 2007/0174915 A1* | 7/2007 | Gribble | G06F 21/53 726/24 |
| 2007/0283439 A1* | 12/2007 | Ballard | G06F 21/562 726/24 |
| 2009/0077544 A1* | 3/2009 | Wu | G06F 21/56 717/160 |
| 2010/0077476 A1* | 3/2010 | Adams | H04L 63/145 726/22 |
| 2010/0115621 A1 | 5/2010 | Staniford et al. | |
| 2010/0154059 A1* | 6/2010 | McNamee | H04L 12/2602 726/23 |
| 2011/0219450 A1* | 9/2011 | McDougal | G06F 21/56 726/23 |
| 2012/0266245 A1* | 10/2012 | McDougal | G06F 21/567 726/24 |
| 2013/0145466 A1* | 6/2013 | Richard | G06F 21/562 726/23 |
| 2013/0167231 A1* | 6/2013 | Raman | H04L 63/1416 726/23 |
| 2014/0165203 A1* | 6/2014 | Friedrichs | G06F 21/56 726/24 |
| 2014/0215617 A1 | 7/2014 | Smith et al. | |
| 2014/0237590 A1 | 8/2014 | Shua et al. | |
| 2015/0096031 A1* | 4/2015 | Benoit | G06F 21/56 726/24 |
| 2015/0172303 A1* | 6/2015 | Humble | H04L 63/1408 726/23 |
| 2015/0180890 A1* | 6/2015 | Ronen | G06F 21/56 726/23 |
| 2016/0098561 A1* | 4/2016 | Keller | G06F 21/554 726/24 |
| 2016/0294851 A1* | 10/2016 | Langton | H04L 63/1416 |
| 2016/0342787 A1* | 11/2016 | Wang | G06F 21/602 |

* cited by examiner

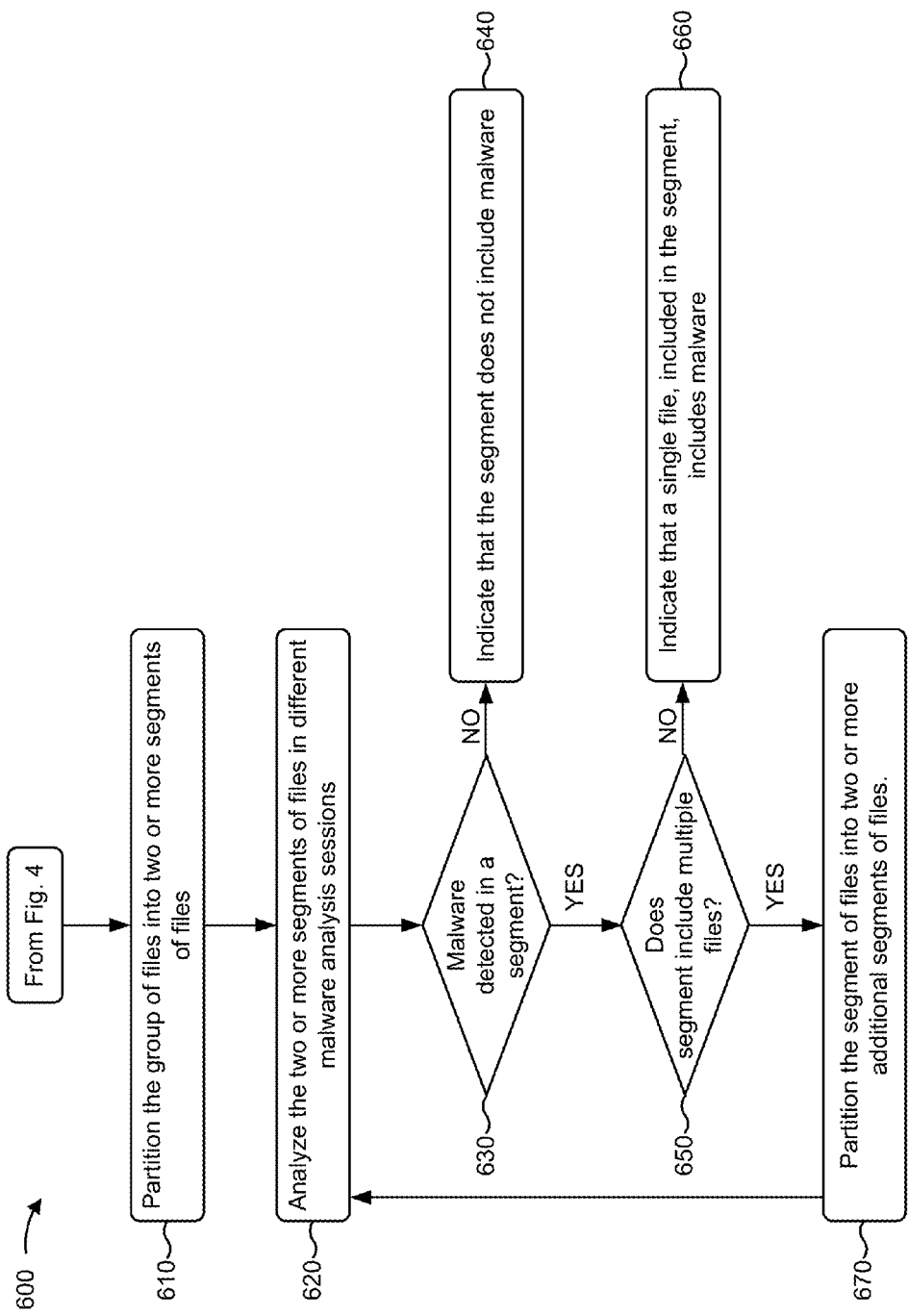

MULTI-FILE MALWARE ANALYSIS

BACKGROUND

Malicious software ("malware") may refer to any software used to disrupt computer operations, gather sensitive information, gain access to private computer systems, or the like. Malware may refer to a variety of types of hostile or intrusive software, including a computer virus, a worm, a trojan horse, ransomware, spyware, adware, scareware, or other malicious software.

A sandbox environment may refer to a computing environment that may be used to test for malware. For example, a sandbox environment may be used to execute untested code, untrusted software (e.g., from unverified third parties), or the like. A sandbox environment may provide a tightly controlled set of resources for executing a software program without permitting the software program to harm a device that hosts the sandbox environment. For example, the sandbox environment may restrict access provided to the software program (e.g., may restrict network access, access to inspect a host system, read and/or write access, etc.) to prevent harm to the host device.

SUMMARY

According to some possible implementations, a device may identify a plurality of files for a multi-file malware analysis. The device may execute the plurality of files in a malware testing environment. The device may monitor the malware testing environment for behavior indicative of malware. The device may detect the behavior indicative of malware. The device may perform a first multi-file malware analysis or a second multi-file malware analysis based on detecting the behavior indicative of malware. The first multi-file malware analysis may include a partitioning technique that partitions the plurality of files into two or more segments of files to identify a file, included in the plurality of files, that includes malware. The second multi-file malware analysis may include a scoring technique that modifies a plurality of malware scores, corresponding to the plurality of files, to identify the file, included in the plurality of files, that includes malware.

According to some possible implementations, a computer-readable medium may store one or more instructions that, when executed by one or more processors, cause the one or more processors to identify a group of files for a multi-file malware analysis. The one or more instructions may cause the one or more processors to execute the group of files concurrently in a testing environment. The one or more instructions may cause the one or more processors to monitor the testing environment for behavior indicative of malware. The one or more instructions may cause the one or more processors to detect the behavior indicative of malware. The one or more instructions may cause the one or more processors to partition the group of files into two or more segments of files. The one or more instructions may cause the one or more processors to analyze the two or more segments of files, separately, for malware. The one or more instructions may cause the one or more processors to determine that a segment of files, included in the two or more segments of files, includes malware based on analyzing the two or more segments of files. The one or more instructions may cause the one or more processors to analyze at least one file, included in the segment of files, for malware based on determining that the segment of files includes malware.

According to some possible implementations, a method may include identifying, by a device, a group of files for a multi-file malware analysis. The method may include executing, by the device, the group of files concurrently in a testing environment. The method may include monitoring, by the device, the testing environment for behavior indicative of malware. The method may include detecting, by the device, the behavior indicative of malware. The method may include modifying, by the device, a group of malware scores, corresponding to the group of files, based on detecting the behavior indicative of malware. The method may include determining, by the device, that a malware score, of the group of malware scores, satisfies a threshold. The malware score may be associated with a file included in the group of files. The method may include analyzing, by the device, the file for malware based on determining that the malware score satisfies the threshold.

BRIEF DESCRIPTION OF THE DRAWINGS

FIG. 6 is a flow chart of an example process for performing a multi-file malware analysis that partitions a group of files into two or more segments to identify a file that includes malware;

DETAILED DESCRIPTION

The following detailed description of example implementations refers to the accompanying drawings. The same reference numbers in different drawings may identify the same or similar elements.

Analyzing files for malware may be a computationally-expensive and time-intensive process. For example, analyzing a file for malware may require processing resources, memory resources, and time. Analyzing a group of files for malware may be particularly expensive when each file is analyzed individually for malware. However, analyzing the group of files concurrently may be prone to inaccuracies in identifying a particular file that includes malware. Implementations described herein assist in accurately analyzing a group of files to identify individual files that include malware, thereby conserving computing resources.

Figure 1:
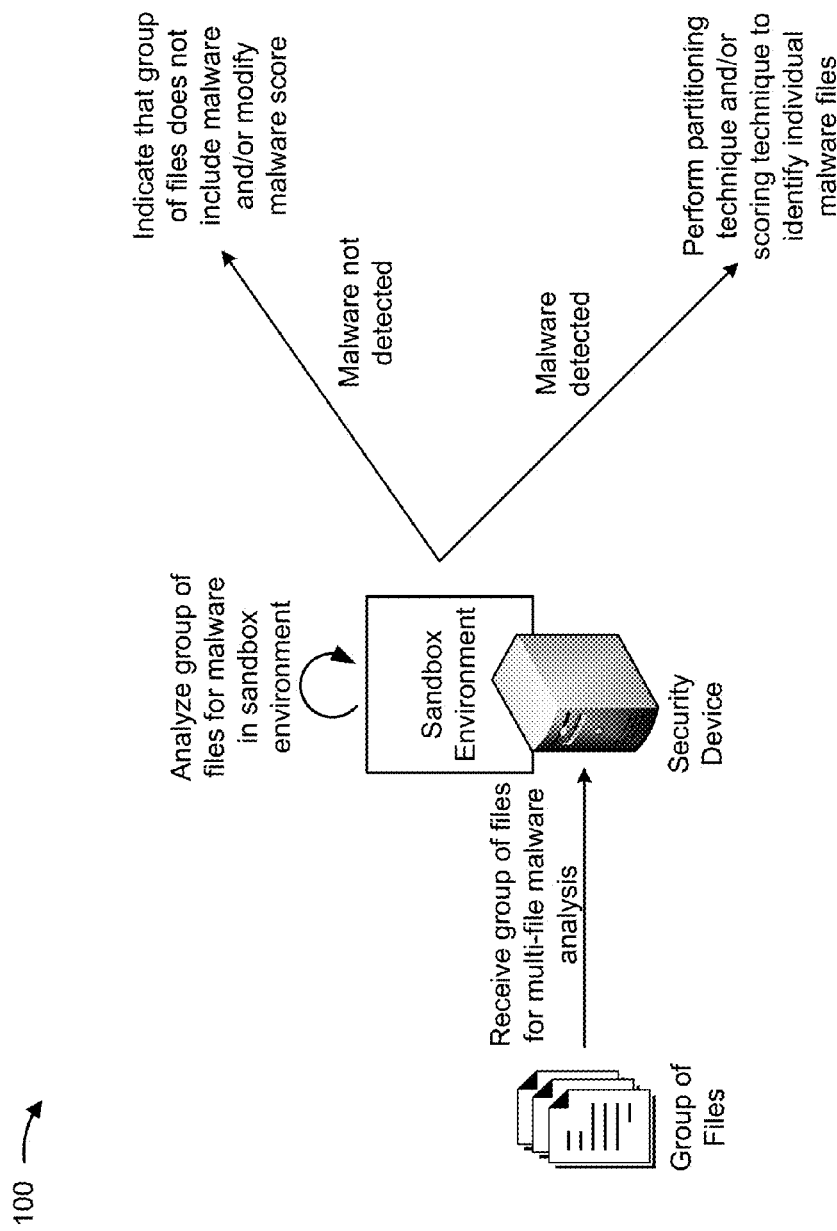
FIG. 1 is a diagram of an overview of an example implementation described herein.

FIG. 1 is a diagram of an overview of an example implementation 100 described herein. As shown in FIG. 1, a security device (e.g., a server, a firewall, a router, a gateway, etc.) may receive a group of files to be analyzed for malware using a multi-file malware analysis. Rather than analyzing each file individually for malware, the security device may analyze the files as a group. For example, the security device may execute the group of files in a sandbox environment, and may monitor the sandbox environment for behavior indicative of malware. The security device may perform one or more multi-file malware analysis techniques to identify one or more files, included in the group of files, that are malware. These multi-file malware analysis techniques are described in more detail elsewhere herein.

As an example, if the security device does not detect behavior indicative of malware after executing the group of files in the sandbox environment (e.g., after a threshold amount of time elapses), then the security device may indicate that the group of files does not include malware. As another example, the security device may modify a malware score associated with the group of files, and may use the malware score to identify individual files to be analyzed for malware.

In some implementations, if the security device detects behavior indicative of malware after executing the group of file in the sandbox environment, the security device may perform a partitioning technique by partitioning the group of files into two or more segments of files. The security device may analyze the segments for malware, and may continue to analyze files in this manner until individual malware files have been identified. For example, the security device may further partition segments associated with behavior indicative of malware until individual files have been identified as malware.

Additionally, or alternatively, if the security device detects behavior indicative of malware after executing the group of file in the sandbox environment, the security device may perform a scoring technique by modifying a group of malware scores corresponding to the group of files. The security device may select additional groups of files to be analyzed (e.g., which may include one or more files from previously-analyzed groups), and may continue to analyze files in this manner until individual malware files have been identified. For example, when a malware score associated with an individual file satisfies a threshold, the security device may analyze the individual file for malware.

In this way, the security device may conserve computing resources by analyzing multiple files for malware as a group, rather than individually analyzing each file for malware.

Figure 2:
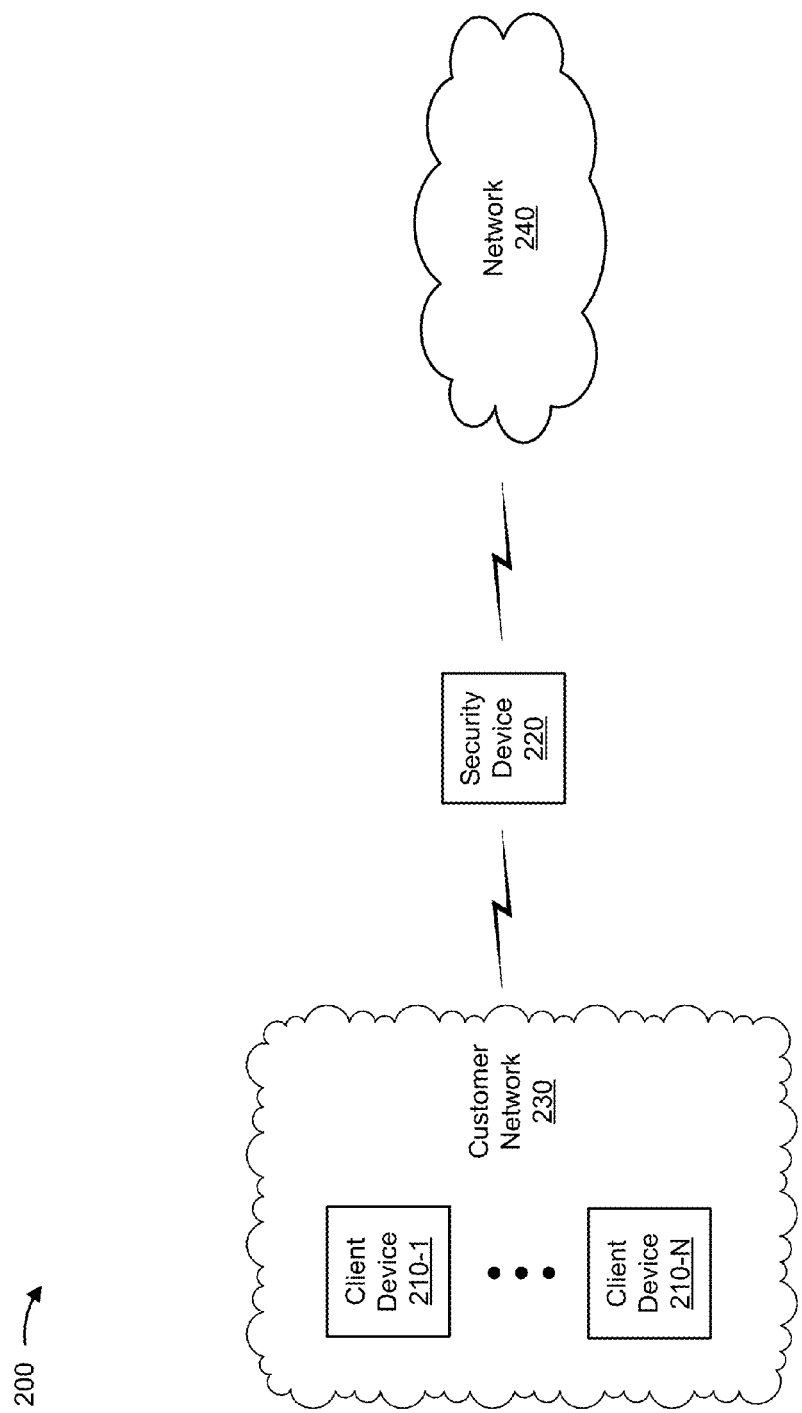
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, and a network 240. Devices of environment 200 may interconnect via wired connections, wireless connections, or a combination of wired and wireless connections.

Client device 210 may include one or more devices capable of executing and/or analyzing files (e.g., computer files). For example, client device 210 may include a desktop computer, a laptop computer, a tablet computer, a mobile phone (e.g., a smart phone, a radiotelephone, etc.), a server, or a similar type of device. In some implementations, client device 210 may be capable of executing and/or analyzing a file that includes malware, which may cause harm to client device 210, information stored by client device 210, a user of client device 210, and/or another client device 210. In some implementations, client device 210 may reside on customer network 230. In some implementations, client device 210 may execute a sandbox environment for a multi-file malware analysis on client device 210 (e.g., instead of or in addition to security device 220 executing a sandbox environment for a multi-file malware analysis on security device 220). For example, client device 210 may analyze a group of files to identify individual files that include malware, as described in more detail elsewhere herein.

Security device 220 may include one or more devices capable of processing and/or transferring network traffic associated with client device 210, and/or capable of providing a security service (e.g., a malware detection service) for client device 210 and/or customer network 230. For example, security device 220 may include a gateway, a firewall, a router, a bridge, a hub, a switch, a load balancer, an access point, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may execute a sandbox environment for a multi-file malware analysis on security device 220. For example, security device 220 may analyze a group of files to identify individual files that include malware, as described in more detail elsewhere herein. In some implementations, security device 220 may execute multiple sandbox environments, for parallel processing of files, when performing a malware analysis. For example, security device 220 may load and/or host multiple virtual machines corresponding to the multiple sandbox environments. Additionally, or alternatively, environment 200 may include multiple security devices 220 that each executes a sandbox environment for parallel processing of files during a malware analysis.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 may perform a multi-file malware analysis for analyzing a group of files requested by one or more client devices 210 from one or more devices (e.g., one or more servers) associated with network 240. Additionally, or alternatively, a group of files may be pushed to one or more client devices 210 (e.g., from one or more devices associated with network 240), and security device 220 may perform a multi-file malware analysis for analyzing the group of files.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
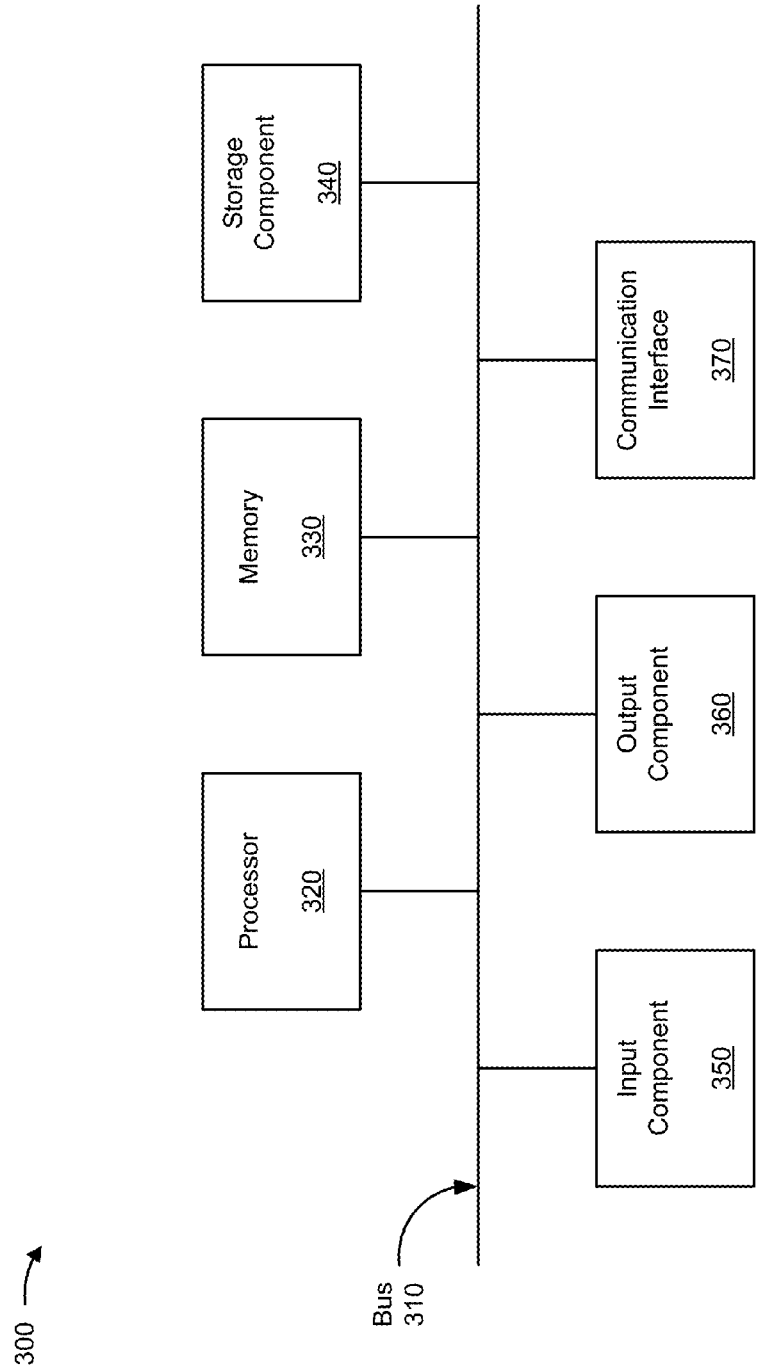
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
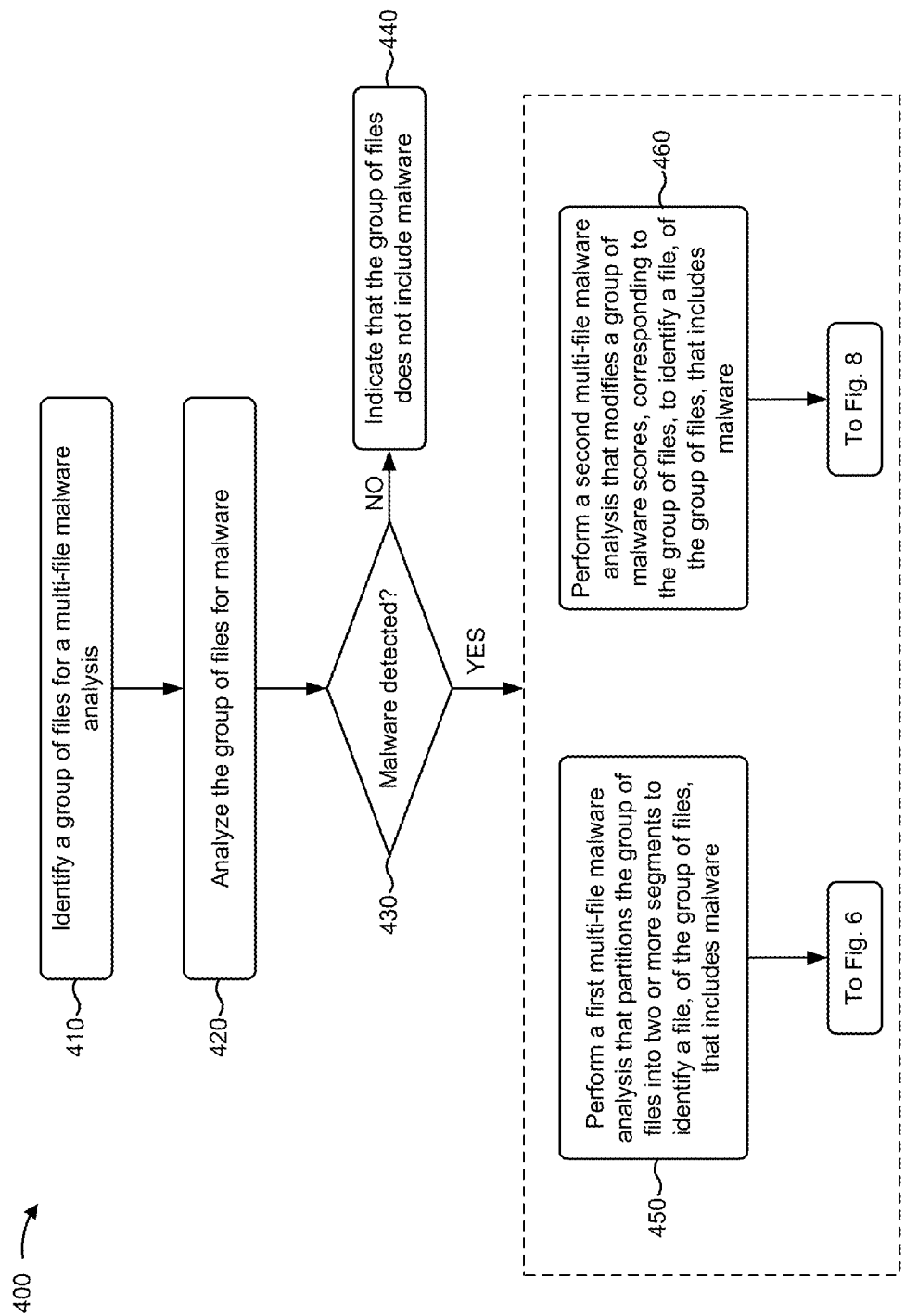
FIG. 4 is a flow chart of an example process for performing a multi-file malware analysis.

FIG. 4 is a flow chart of an example process 400 for performing a multi-file malware analysis. In some implementations, one or more process blocks of FIG. 4 may be performed by security device 220. In some implementations, one or more process blocks of FIG. 4 may be performed by another device or a set of devices separate from or including security device 220, such as client device 210.

As shown in FIG. 4, process 400 may include identifying a group of files for a multi-file malware analysis (block 410). For example, security device 220 may identify a group of two or more files for a multi-file malware analysis. In some implementations, the group of files may be associated with one or more client devices 210 (e.g., may be stored by client device(s) 210, may be executing on client device(s) 210, may be requested by client device(s) 210, may be sent to client device(s) 210, etc.). For example, the group of files may include one or more files requested by client device(s) 210 (e.g., associated with customer network 230). As another example, the group of files may include one or more files pushed to client device(s) 210. A file may include, for example, an executable file, an application, a program, a document, a driver, a script, or the like.

In some implementations, security device 220 may identify (e.g., select) the group of files from a larger total group of files (e.g., the group of files may be a subset of the total group of files). For example, security device 220 may randomly select the group of files from the total group. In some implementations, security device 220 may select files to form the group of files such that the group is likely to include a single file that is malware and a remaining set of files that are not malware. For example, the total group of files may undergo an initial analysis, such as a virus analysis (e.g., using an anti-virus application), that may indicate a likelihood that individual files, included in the total group, are malware. Security device 220 may use these likelihoods to create the group of files (e.g., by selecting one file with a high likelihood of being malware (e.g., the highest likelihood), and multiple files with a low likelihood of being malware (e.g., the lowest likelihoods)).

The group of files may be associated with one or more source devices (e.g., one or more servers) that provide one or more files included in the group. For example, a file may be provided by a single source device (e.g., associated with network 240). As another example, different files may be provided by different source devices. In some implementations, the group of files may be received as a group (e.g., concurrently). In some implementations, the group of files may be received during different time periods. In some implementations, a file may be added to a queue (e.g., a queue that includes the total group of files) as the file is received by security device 220. Security device 220 may identify the group of files from the queue.

In some implementations, security device 220 may determine a size for the group of files based on a likelihood of the group including a file that is malware. Additionally, or alternatively, security device 220 may determine a size for the group of files based on a likelihood that a sandbox environment will detect malware in the group of files. In this way, security device 220 may form groups in a manner that reduces and/or optimizes an amount of time and/or computing resources required to perform the multi-file malware analysis.

In some implementations, the group of files may include files that require human interaction (e.g., to execute). For example, the group of files may include only files that require human interaction. In some implementations, the group of files may include files that do not require human interaction (e.g., to execute). For example, the group of files may include only files that do not require human interaction. In this way, security device 220 may form a group of files that are easy to analyze for malware (e.g., files that do not require human interaction to execute), and may form a group of files that are difficult to analyze for malware (e.g., files that require human interaction to execute). Security device 220 may analyze these different groups in a different manner, in some implementations.

As further shown in FIG. 4, process 400 may include analyzing the group of files for malware (block 420), and determining whether malware is detected (block 430). For example, security device 220 may analyze the group of files to determine whether any files, included in the group of files, are malware. In some implementations, security device 220 may analyze the group of files in a testing environment (e.g., a malware testing environment), such as a sandbox environment. For example, the testing environment may include a virtual computing environment executing on one or more virtual machines.

Security device 220 may analyze the group of files for malware by executing the group of files in the testing environment, and by monitoring the testing environment for behavior indicative of malware. For example, security device 220 may execute each file, in the group of files, sequentially or in parallel. Security device 220 may then monitor the testing environment, for a threshold amount of time, for behavior indicative of malware. Security device 220 may monitor the testing environment to determine whether the group of files includes malware (e.g., includes at least one file that is malware).

As further shown in FIG. 4, if malware is not detected (block 430—NO), process 400 may include indicating that the group of files does not include malware (block 440). For example, if security device 220 does not detect behavior indicative of malware (e.g., after a threshold amount of time), security device 220 may indicate that the group of files does not include malware. In some implementations, security device 220 may indicate that the group of files does not include malware by storing an indication (e.g., in a data structure) that the group of files does not include malware (e.g., that each file, included in the group of files, is not malware). Additionally, or alternatively, security device 220 may prevent the group of files from undergoing an additional malware analysis.

Additionally, or alternatively, security device 220 may indicate, to another device, that the group of files does not include malware. For example, security device 220 may provide an indication (e.g., to client device 210, to a device associated with a network administrator, etc.) that the group of files does not include malware. Additionally, or alternatively, security device 220 may permit one or more client devices 220 to access files included in the group of files (e.g., based on an indication that the group of files does not include malware).

Figure 8:
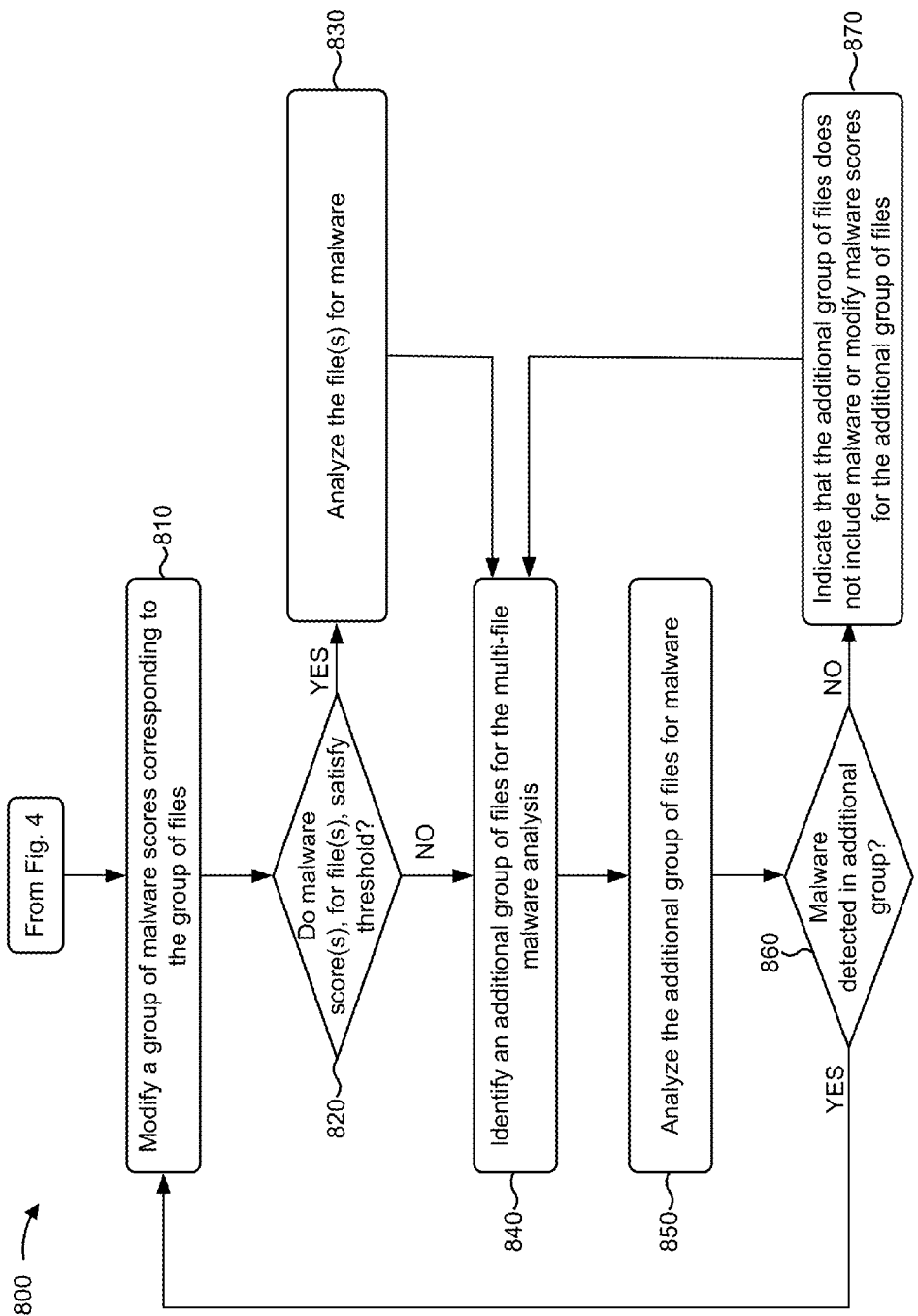
FIG. 8 is a flow chart of an example process for performing a malware analysis that modifies a group of malware scores, corresponding to a group of files, to identify a file that includes malware.

Additionally, or alternatively, security device 220 may modify a group of malware scores corresponding to the group of files, as described in more detail elsewhere herein in connection with FIG. 8. In some implementations, security device 220 may modify a malware score to indicate that a file, included in the group of files, is less likely to include malware (e.g., than indicated by a previous malware score for the file).

As further shown in FIG. 4, if malware is detected (block 430—YES), process 400 may include performing a first multi-file malware analysis that partitions the group of files into two or more segments to identify a file, of the group of files, that includes malware (block 450) and/or performing a second multi-file malware analysis that modifies a group of malware scores, corresponding to the group of files, to identify a file, of the group of files, that includes malware (block 460). For example, if security device 220 detects behavior indicative of malware, security device 220 may indicate that the group of files includes malware. Additionally, or alternatively, security device 220 may further analyze the group of files using a first multi-file malware analysis technique and/or a second multi-file malware analysis technique.

The first multi-file malware analysis technique may include a partitioning technique. For example, security device 220 may partition the group of files, that includes malware, into two or more segments of files. Security device 220 may analyze the segments for malware, as described below in connection with FIG. 6.

The second multi-file malware analysis technique may include a scoring technique. For example, security device 220 may modify a group of malware scores corresponding to the group of files that includes malware. Security device 220 may use the malware scores to identify malware, as described below in connection with FIG. 8.

In some implementations, security device 220 may identify malware (e.g., one or more files, included in the group of files, that are malware) using the partitioning technique. In some implementations, security device 220 may identify malware using the scoring technique. In some implementations, security device 220 may identify malware using the partitioning technique and the scoring technique. For example, security device 220 may use the partitioning technique to create a segment of files, and may analyze the segment of files using the scoring technique. As another example, security device 220 may use the scoring technique to identify a set of files with malware scores that satisfy a threshold, and may analyze the set of files using the partitioning technique. These and other alternatives are described in more detail elsewhere herein.

By analyzing a group of files concurrently, security device 220 may conserve computing resources that would otherwise be expended if each file, in the group of files, was to be analyzed individually. For example, security device 220 may conserve processing resources, memory resources, computing time, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
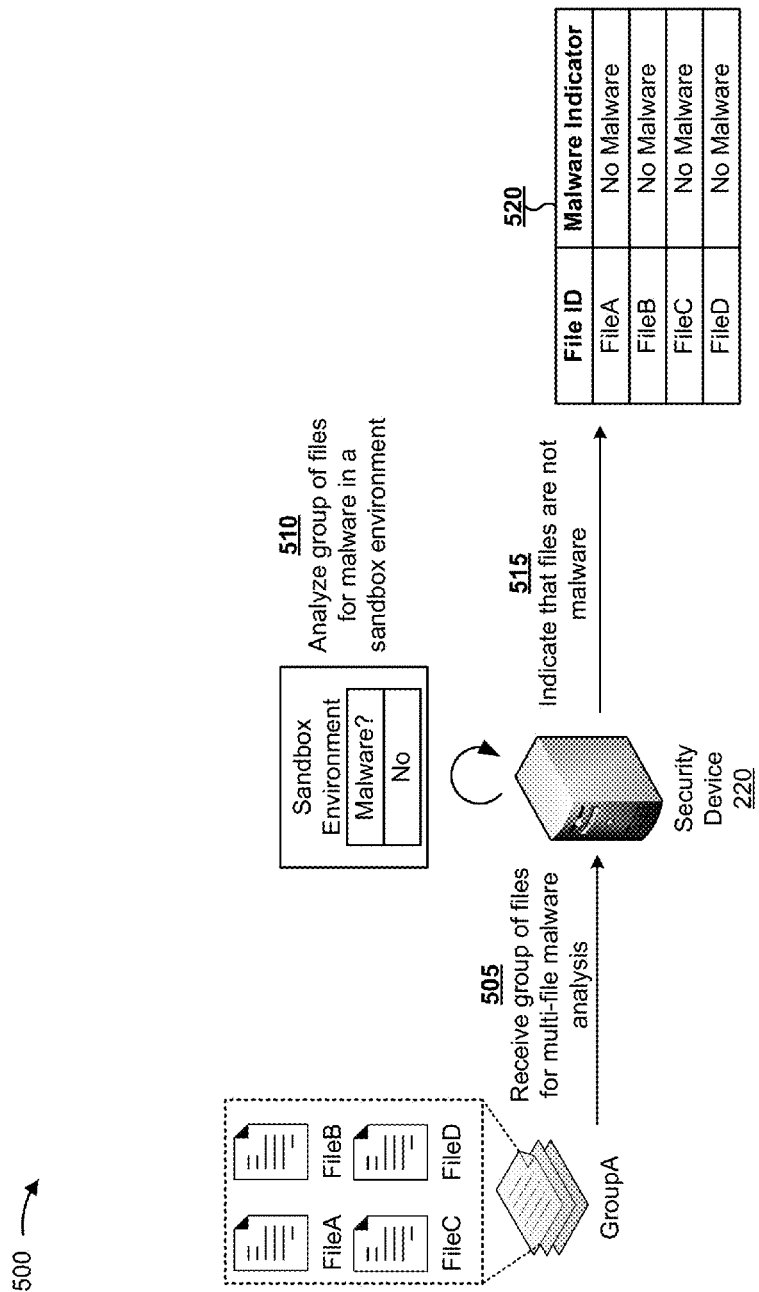
FIGS. 5A and 5B are diagrams of an example implementation relating to the example process shown in FIG. 4.
Figure 5B:
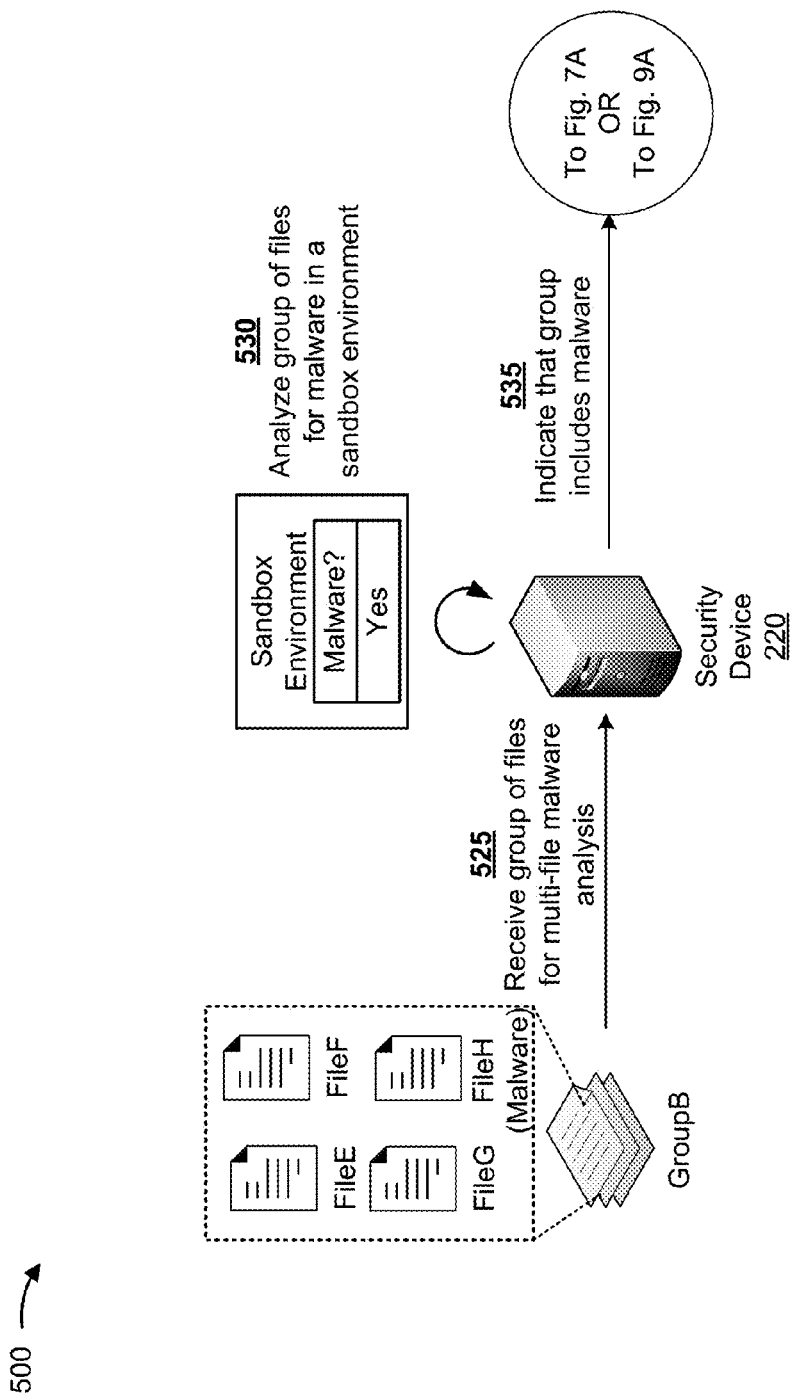

FIGS. 5A and 5B are diagrams of an example implementation 500 relating to example process 400 shown in FIG. 4. FIGS. 5A and 5B show an example of performing a multi-file malware analysis.

As shown in FIG. 5A, and by reference number 505, assume that security device 220 receives a group of files for a multi-file malware analysis. As shown, assume that the group of files, shown as "GroupA," includes four files, shown as "FileA," "FileB," "FileC," and "FileD." For the purpose of FIG. 5A, assume that none of these files are malware. As shown by reference number 510, assume that security device 220 analyzes the group of files (GroupA) in a sandbox environment, and monitors the sandbox environment for behavior indicative of malware. As shown, assume that such behavior is not detected (e.g., after a threshold amount of time). Thus, as shown by reference number 515, security device 220 may indicate that the files, included in the group, do not include malware. For example, as shown by reference number 520, security device 220 may store an indication that FileA, FileB, FileC, and FileD are not malware. Additionally, or alternatively, security device 220 may permit another device (e.g., one or more client devices 210) to access and/or execute these files.

As shown in FIG. 5B, and by reference number 525, assume that security device 220 receives another group of files for a multi-file malware analysis. As shown, assume that this group of files, shown as "GroupB," includes four files, shown as "FileE," "FileF," "FileG," and "FileH." For the purpose of FIG. 5B, assume that FileH is malware. As shown by reference number 530, assume that security device 220 analyzes the group of files (GroupB) in a sandbox environment, and monitors the sandbox environment for behavior indicative of malware. As shown, assume that such behavior is detected. Thus, as shown by reference number 535, security device 220 may indicate that the group of files includes malware. Based on this indication, security device 220 may perform a partitioning technique to analyze the group of files, as described below in connection with FIGS. 7A and 7B, and/or may perform a scoring technique to analyze the group of files, as described below in connection with FIGS. 9A-9C. In this way, security device 220 may reduce an amount of time and/or computer resources needed to analyze files for malware (e.g., by indicating that an entire group of files does not require further malware analysis, as shown in FIG. 5A, and/or by performing a multi-file analysis to narrow a group of files to individual files that are malware).

As indicated above, FIGS. 5A and 5B are provided merely as an example. Other examples are possible and may differ from what was described with regard to FIGS. 5A and 5B.

FIG. 6 is a flow chart of an example process 600 for performing a multi-file malware analysis that partitions a group of files into two or more segments to identify a file that includes malware. In some implementations, one or more process blocks of FIG. 6 may be performed by security device 220. In some implementations, one or more process blocks of FIG. 6 may be performed by another device or a set of devices separate from or including security device 220, such as client device 210.

As shown in FIG. 6, process 600 may include partitioning a group of files, indicated as including malware, into two or more segments of files (block 610). For example, security device 220 may determine that a group of files includes malware (e.g., includes one or more files that are malware), as described above in connection with FIG. 4. Based on this determination, security device 220 may partition the group of files into two or more segments of files. For example, security device 220 may partition the group of files into two segments, three segments, four segments, etc. A segment of files may include one or more files.

In some implementations, security device 220 may partition the group of files into segments of equal sizes (e.g., that include an equal number of files). In some implementations, security device 220 may partition the group of files into segments of unequal sizes. In some implementations, security device 220 may determine a size for a segment, one or more files to be included in the segment, or the like, in a manner described above in connection with block 410 of FIG. 4 for a group of files.

In some implementations, security device 220 may determine one or more malware likelihoods corresponding to one or more files included in the group of files. A malware likelihood for a file may indicate a likelihood that the file is malware. In this case, security device 220 may create the segments based on one or more malware likelihoods. Security device 220 may create the segments to increase a likelihood that a segment includes a single file that is malware, with the remaining files not being malware. This may reduce a number of iterations needed to identify the single file as malware, thereby conserving computer resources.

In some implementations, security device 220 may determine a malware likelihood for a file based on an initial analysis (e.g., an initial malware analysis, an initial anti-virus analysis, etc.). In some implementations, security device 220 may determine a malware likelihood for a file by training a probabilistic model (e.g., using machine learning) using a training set of files (e.g., some of which are known to be malware and some of which are known not to be malware). Security device 220 may determine a malware likelihood for a file by comparing features of the file to features of the training set of files, and identifying a malware likelihood based on the comparison.

Additionally, or alternatively, security device 220 may determine a malware likelihood based on a first time when a file is executed (e.g., in a testing environment) and a second time when behavior indicative of malware is detected (e.g., based on monitoring the testing environment). For example, when behavior indicative of malware is detected after a first file is executed and before a second file is executed, the first file may be more likely to be malware than the second file. In this case, security device 220 may associate the first file with a higher malware likelihood than the second file.

As further shown in FIG. 6, process 600 may include analyzing the two or more segments of files in different malware analysis sessions (block 620). For example, security device 220 may analyze a first segment of files in a first malware analysis session, and may analyze a second segment of files in a second (e.g., different) malware analysis session. A malware analysis session may refer to a particular time period during which one or more files are analyzed for malware using a particular testing environment. Thus, security device 220 may analyze different segments at different time periods (e.g., completely separate time periods, overlapping time periods, etc.) and/or using different testing environments (e.g., executing on different security devices 220, executing on different virtual machines of a single security device 220, etc.).

In some implementations, security device 220 may use the same testing environment to analyze the segments during different time periods (e.g., time periods that do not overlap). For example, a first malware analysis session may analyze files for malware during a first time period and using a first testing environment, and a second malware analysis session may analyze files for malware during a second time period and using the first testing environment. In this way, security device 220 may use a single testing environment to analyze the segments at different times, thereby conserving computer resources as compared to using multiple testing environments.

In some implementations, security device 220 may use different testing environments to analyze the segments during an overlapping time period. For example, a first malware analysis session may analyze files for malware during a first time period and using a first testing environment, and a second malware analysis session may analyze files for malware during the first time period and using a second testing environment. In this way, security device 220 may determine whether the segments include malware in a shorter amount of time as compared to using a single testing environment during different time periods, thereby improving a user experience by making non-malware files available to a user earlier in time.

In some implementations, security device 220 may use different testing environments to analyze the segments during different time periods (e.g., that do not overlap). For example, a first malware analysis session may analyze files for malware during a first time period and using a first testing environment, and a second malware analysis session may analyze files for malware during a second time period and using a second testing environment. In this way, security device 220 may flexibly use available resources (e.g., computing resources, time, etc.) when analyzing the segments for malware.

As further shown in FIG. 6, process 600 may include determining whether malware is detected in a segment (block 630). For example, security device 220 may analyze each segment of files (e.g., serially, in parallel, using a same testing environment, using a different testing environment, etc.) to determine whether any files, included in a segment of files, are malware. Security device 220 may analyze a segment of files for malware by executing the segment of files in the testing environment, and by monitoring the testing environment for behavior indicative of malware. For example, security device 220 may execute each file, in the segment of files, sequentially or in parallel. Security device 220 may then monitor the testing environment, for a threshold amount of time, for behavior indicative of malware.

As shown in FIG. 6, if malware is not detected in the segment (block 630—NO), process 600 may include indicating that the segment does not include malware (block 640). For example, if security device 220 does not detect behavior indicative of malware (e.g., after a threshold amount of time), security device 220 may indicate that the segment of files does not include malware. In some implementations, security device 220 may indicate that the segment of files does not include malware by storing an indication (e.g., in a data structure) that the segment of files does not include malware (e.g., that each file, included in the segment of files, is not malware). Additionally, or alternatively, security device 220 may prevent the segment of files from undergoing an additional malware analysis.

Additionally, or alternatively, security device 220 may indicate, to another device, that the segment of files does not include malware. For example, security device 220 may provide an indication (e.g., to client device 210, to a device associated with a network administrator, etc.) that the segment of files does not include malware. Additionally, or alternatively, security device 220 may permit one or more client devices 220 to access files included in the segment of files (e.g., based on an indication that the segment of files does not include malware).

As shown in FIG. 6, if malware is detected in the segment (block 630—YES), process 600 may include determining whether the segment includes multiple files (block 650). For example, if security device 220 detects behavior indicative of malware after executing a segment of files, security device 220 may determine whether the segment includes multiple files. In some implementations, the segment may include a single file. In some implementations, the segment may include multiple files. Security device 220 may determine whether the segment includes a single file or multiple files.

As further shown in FIG. 6, if the segment does not include multiple files (block 650—NO), process 600 may include indicating that a single file, included in the segment, includes malware (block 660). For example, if security device 220 determines that the segment includes a single file (e.g., does not include multiple files), then security device 220 may indicate that the single file includes malware (e.g., the single file is a malware file). In some implementations, security device 220 may indicate that the single file includes malware by storing an indication (e.g., in a data structure) that the file includes malware.

Additionally, or alternatively, security device 220 may indicate, to another device, that the single file includes malware. For example, security device 220 may provide an indication (e.g., to client device 210, to a device associated with a network administrator, etc.) that the file includes malware. Additionally, or alternatively, security device 220 may prevent one or more client devices 220 from accessing the file (e.g., based on an indication that the file includes malware), may cause one or more client devices 220 to take a remedial action to remove or eliminate the effect of malware, or the like. In this way, security device 220 may analyze a group of files concurrently, and may partition the group until individual files are identified as malware, thereby conserving computing resources.

As further shown in FIG. 6, if the segment includes multiple files (block 650—YES), process 600 may include partitioning the segment of files into two or more additional segments of files (block 670) and returning to block 620 to analyze the two or more additional segments for malware. For example, if security device 220 determines that the segment includes multiple files (e.g., includes more than a single file), then security device 220 may partition the segment into two or more additional segments of files. Security device 220 may create the two or more additional segments in a manner as described above in connection with block 610. Security device 220 may analyze the two or more additional segments of files in a manner as described in connection with one or more of blocks 620-670.

In other words, security device 220 may iteratively create segments of files, and may analyze the segments until individual malware files are identified. In this way, security device 220 may conserve computing resources that would otherwise be expended if the files were each analyzed individually.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
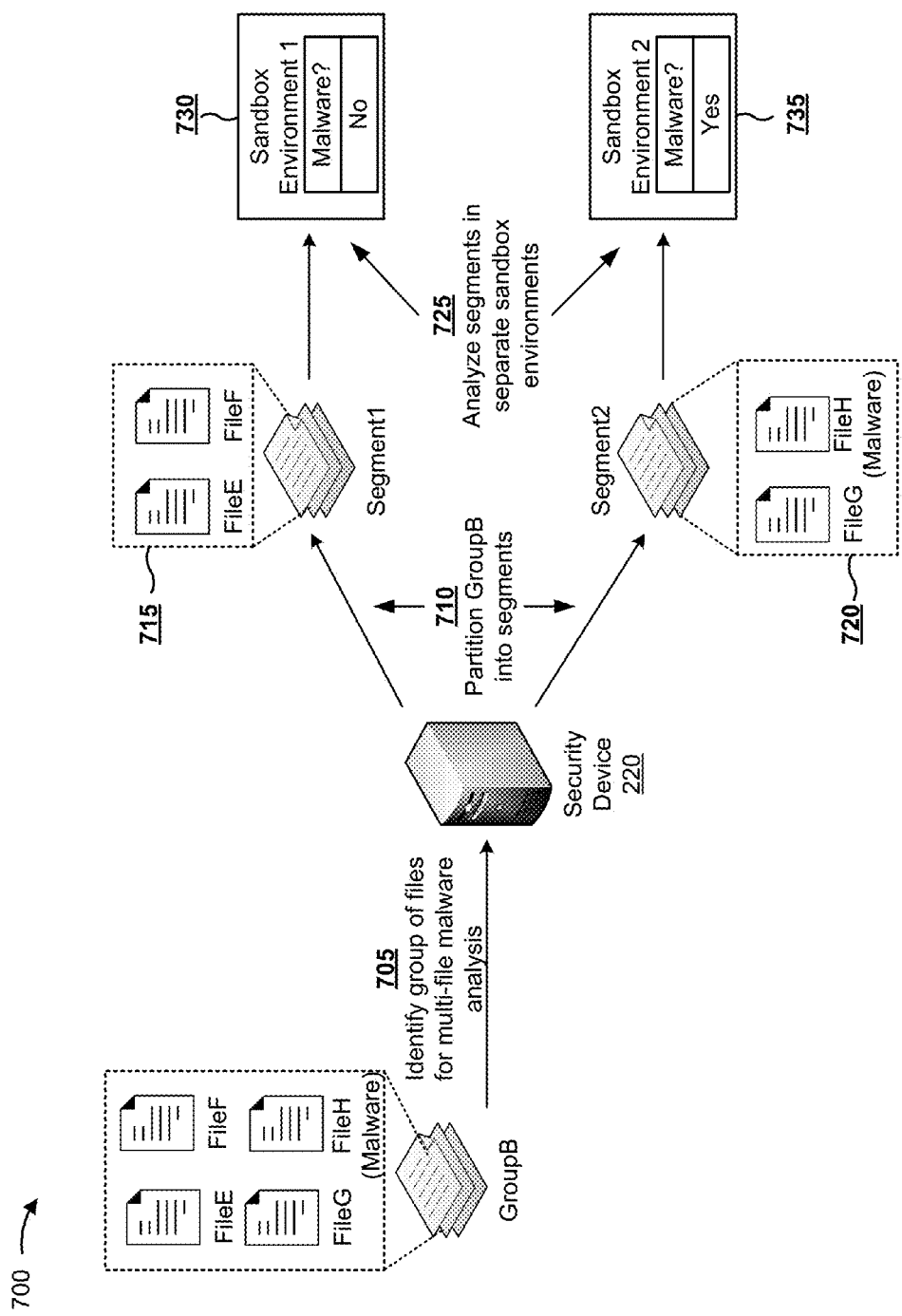
FIGS. 7A and 7B are diagrams of an example implementation relating to the example process shown in FIG. 6.
Figure 7B:
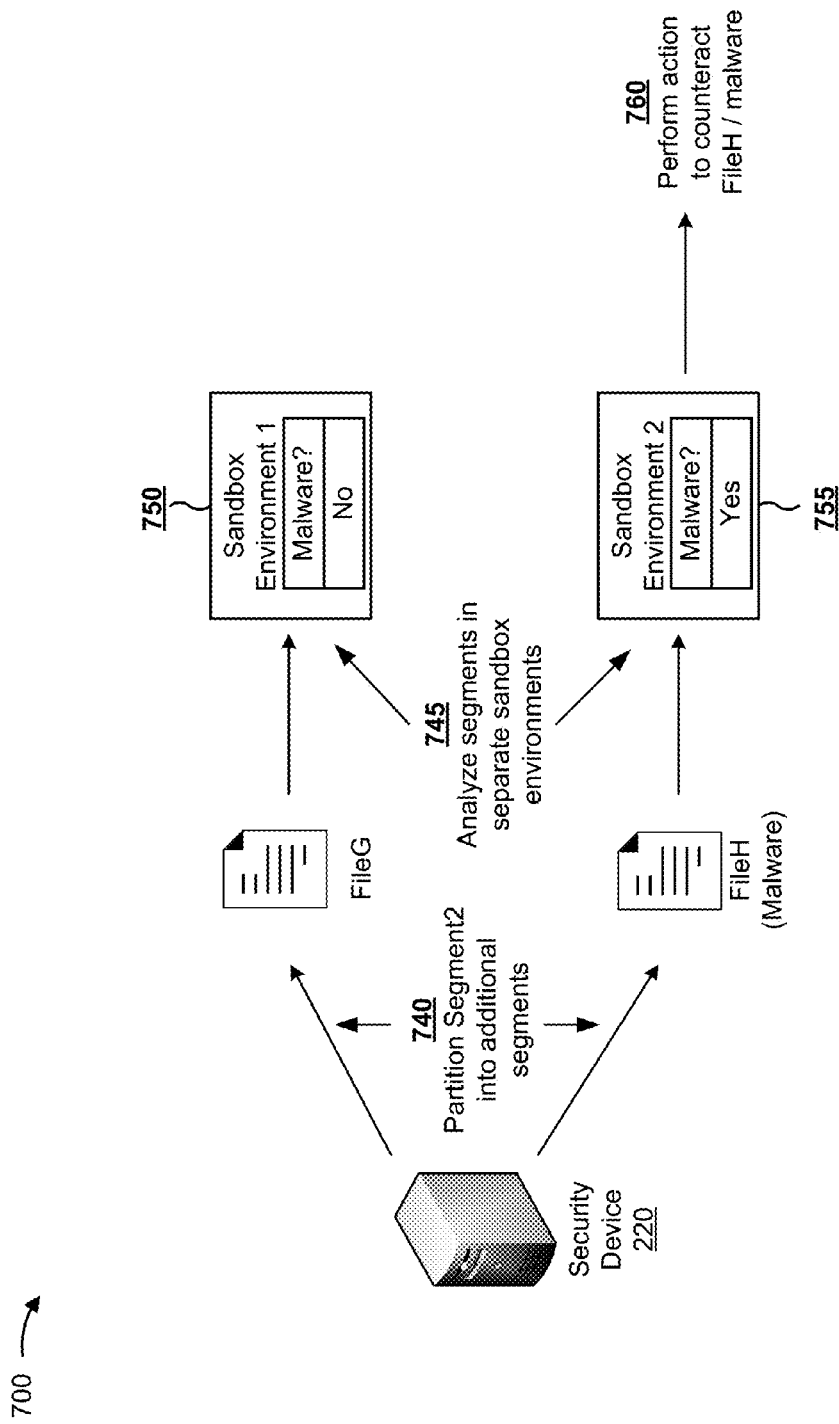

FIGS. 7A and 7B are diagrams of an example implementation 700 relating to example process 600 shown in FIG. 6. FIGS. 7A and 7B show an example of performing a multi-file malware analysis that partitions a group of files into two or more segments to identify a file that includes malware. For the purpose of FIGS. 7A and 7B, assume that the operations described herein in connection with FIG. 5B have been performed. For example, assume that security device 220 has received a group of files identified as GroupB, and has determined that GroupB includes malware.

As shown in FIG. 7A, and by reference number 705, assume that security device 220 identifies a group of files for a multi-file malware analysis. For example, and as described above in connection with FIG. 5B, assume that security device 220 identifies GroupB, which includes FileE, FileF, FileG, and FileH, as a group of files that includes malware (e.g., assume that FileH is malware). As shown by reference number 710, based on determining that GroupB includes malware, security device 220 partitions GroupB into two segments of files. As shown by reference number 715, assume that the first segment, shown as Segment1, includes FileE and FileF (e.g., does not include malware). As shown by reference number 720, assume that the second segment, shown as Segment2, includes FileG and FileH (e.g., includes malware).

As shown by reference number 725, assume that security device 220 analyzes the two segments in separate sandbox environments. As shown by reference number 730, assume that security device 220 determines that Segment1 does not include malware. As shown by reference number 735, assume that security device 220 determines that Segment2 includes malware. In some implementations, security device 220 may analyze the different segments in parallel, thereby reducing an amount of time to obtain a malware verdict and enhancing a user experience (e.g., by permitting access to files, by client device(s) 210 earlier than if the files were analyzed individually).

As shown in FIG. 7B, based on determining that Segment2 includes malware, security device 220 may partition Segment2 into additional segments, as shown by reference number 740. In this case, since Segment2 includes two files, the additional segments may each include a single file, shown as FileG and FileH, which includes malware. As shown by reference number 745, assume that security device 220 analyzes FileG and FileH in separate sandbox environments. As shown by reference number 750, assume that security device 220 determines that FileG is not malware. In this case, security device 220 may indicate that FileG is not malware, and/or may permit client device(s) 210 to access FileG. As shown by reference number 755, assume that security device 220 determines that FileH is malware. In this case, and as shown by reference number 760, security device 220 may perform an action to counteract FileH, determined to be malware. For example, security device 220 may indicate that FileH is malware, may prevent client device(s) 210 from accessing FileH, may notify a device associated with an administrator that FileH is malware, or the like.

By performing a multi-file malware analysis for a group of files, such as using the partitioning technique shown in FIGS. 7A and 7B, security device 220 may conserve computing resources and time that would otherwise be expended if security device 220 individually analyzed each file included in the group of files.

As indicated above, FIGS. 7A and 7B are provided merely as an example. Other examples are possible and may differ from what was described with regard to FIGS. 7A and 7B.

FIG. 8 is a flow chart of an example process 800 for performing a malware analysis that modifies a group of malware scores, corresponding to a group of files, to identify a file that includes malware. In some implementations, one or more process blocks of FIG. 8 may be performed by security device 220. In some implementations, one or more process blocks of FIG. 6 may be performed by another device or a set of devices separate from or including security device 220, such as client device 210.

As shown in FIG. 8, process 800 may include modifying a group of malware scores corresponding to a group of files indicated as including malware (block 810). For example, security device 220 may determine that a group of files includes malware (e.g., includes one or more files that are malware), as described above in connection with FIG. 4. Based on this determination, security device 220 may modify a group of malware scores corresponding to the group of files. For example, security device 220 may associate each file, included in the group of files, with a malware score. In some implementations, security device 220 may store, in a data structure, a file identifier that identifies a file (e.g., using a file name, a hash value generated based on the file, etc.). Security device 220 may store, in association with the file identifier, a malware score that indicates a likelihood that the file is malware.

As an example, the malware score may include a malware counter. Security device 220 may initialize the malware counter, for a file, to zero. Security device 220 may increment the malware counter (e.g., by one) each time that security device 220 determines that a group of files, that includes the file, includes malware. In some implementations, security device 220 may decrement the malware counter (e.g., by one) each time that security device 220 determines that a group of files, that includes the file, does not include malware. Additionally, or alternatively, security device 220 may increment a non-malware counter (e.g., by one) for a file each time that security device 220 determines that a group of files, that includes the file, does not include malware.

In some implementations, security device 220 may initialize a malware score to a value that indicates that a file, associated with the malware score, is more likely or less likely to be malware. As an example, security device 220 may initialize a malware counter to a value other than zero (e.g., a value of one, a value of two, etc.). Security device 220 may initialize the malware score based on one or more factors that indicate a likelihood that the file is malware (e.g., a result of an anti-virus analysis, a comparison to a database of known malware files, a comparison to a database of non-malware files, a size of the file, a type of the file, whether the file is an executable, etc.).

As further shown in FIG. 8, process 800 may include determining whether one or more malware scores, for one or more files, satisfy a threshold (block 820). For example, security device 220 may analyze one or more malware scores, corresponding to one or more files, to determine whether the one or more malware scores satisfy a threshold. For example, security device 220 may compare malware scores, for analyzed files, to a threshold value. In some implementations, security device 220 may determine the threshold value based on user input, based on a default threshold value, based on a quantity of files that have been analyzed, based on a total quantity of files to be analyzed, or the like.

As further shown in FIG. 8, if one or more malware scores, for one or more files, satisfy a threshold (block 820—YES), process 800 may include analyzing the file(s) for malware (block 830). For example, if security device 220 determines that a malware score, for a file, satisfies the threshold, then security device 220 may analyze the file (e.g., individually) for malware. In this way, security device 220 may individually analyze a file for malware when the file has a higher probability of being malware (e.g., as indicated by the malware score), thereby conserving computing resources that would otherwise be expended analyzing files with lower probabilities of being malware.

In some implementations, multiple malware scores may satisfy the threshold. In this case, security device 220 may analyze multiple files, corresponding to the multiple malware scores, for malware (e.g., serially or in parallel). In some implementations, security device 220 may analyze each of the multiple files individually. Additionally, or alternatively, security device 220 may analyze the multiple files as a group. For example, security device 220 may analyze the multiple files using the partitioning technique described in connection with FIG. 6 (e.g., where the multiple files are partitioned into two or more segments, as described in connection with block 610).

Additionally, or alternatively, security device 220 may identify an additional group of files for the multi-file malware analysis (e.g., after analyzing the file(s) associated with the malware score(s) that satisfy the threshold, concurrently with analyzing the file(s) associated with the malware score(s) that satisfy the threshold, etc.), as described below in connection with block 840. In some implementations, security device 220 may identify an additional group of files that does not include the file(s) associated with the malware score(s) that satisfy the threshold.

As further shown in FIG. 8, if one or more malware scores, for one or more files, does not satisfy a threshold (block 820—NO), process 800 may include identifying an additional group of files for the multi-file malware analysis (block 840). For example, security device 220 may identify an additional group of files for the multi-file malware analysis. The additional group of files may be different from the group of files identified in connection with block 410 of FIG. 4. In some implementations, the additional group of files may be completely different from the group of files (e.g., may not include any of the same files). In some implementations, the additional group of files may include one or more files that were included in the group of files, and one or more files that were not included in the group of files. In some implementations, security device 220 may determine a size for the additional group, one or more files to be included in the additional group, or the like, in a manner described above in connection with block 410 of FIG. 4 for a group of files.

In some implementations, security device 220 may randomly select files to include in the additional group of files. For example, there may be a total group of files to be analyzed for malware. The group of files identified as described in connection with block 410 of FIG. 4 may be a subset of the total group. Furthermore, the additional group of files may be a subset of the total group (e.g., a different subset). Security device 220 may identify the group of files and/or the additional group of files by randomly selecting files from the total group of files (e.g., to form a subset of a particular size, which may be a default size, a size determined based on user input, a size that is a particular percentage of the size of the total group, etc.).

In some implementations, security device 220 may select one or more files, that have already been analyzed, for inclusion in the additional group. For example, security device 220 may select one or more files associated with a malware score other than zero, may select one or more files associated with a malware score that satisfies a threshold (e.g., one or more files with the highest malware score(s) as compared to malware scores of other analyze files), or the like. Additionally, or alternatively, security device 220 may select one or more files, that have not already been analyzed, for inclusion in the additional group.

By re-analyzing one or more files that have already been analyzed, security device 220 may narrow down a list of files that may be malware. For example, if a file is repeatedly included in a group of files that test positive for malware (e.g., a threshold quantity of times), then security device 220 may determine that the file is more likely to be malware (e.g., as compared to other files), and may determine to individually analyze that file for malware (e.g., as described in connection with block 830). Conversely, if a file is included in a group that tests negative for malware (e.g., a single time, a threshold quantity of times, etc.), then security device 220 may determine that the file is less likely to be malware (e.g., as compared to other files), and may indicate that the file does not include malware, as described below in connection with block 870.

In some implementations, security device 220 may use a malware counter for a file. The malware counter may indicate a quantity of times that the file has been included in a group of files that tests positive for malware. Additionally, or alternatively, security device 220 may use a non-malware counter for a file. The non-malware counter may indicate a quantity of times that the file has been included in a group of files that tests negative for malware. In some implementations, if the malware counter satisfies a first threshold, security device 220 may analyze the file for malware. Additionally, or alternatively, if the non-malware counter satisfies a second threshold, security device 220 may indicate that the file is not malware (e.g., may indicate that the file is clean). In some implementations, the first threshold and the second threshold may be different values. In some implementations, the first threshold and the second threshold may be a same value.

Additionally, or alternatively, security device 220 may track a quantity of times that a file has been analyzed (e.g., a quantity of times that the file has been included in a group that has been analyzed). In some implementations, if the quantity of times that the file has been analyzed satisfies a threshold, and a malware score for the file does not satisfy a threshold (e.g., a different threshold), then security device 220 may indicate that the file is not malware (e.g., may indicate that the file is clean). In this way, security device 220 may prevent a file from being analyzed indefinitely.

As further shown in FIG. 8, process 800 may include analyzing the additional group of files for malware (block 850), and determining whether malware is detected in the additional group (block 860). For example, security device 220 may analyze the additional group of files to determine whether any files, included in the additional group of files, are malware. In some implementations, security device 220 may analyze the additional group of files in a testing environment, such as a sandbox environment. Security device 220 may analyze the additional group of files for malware by executing the additional group of files in the testing environment, and by monitoring the testing environment for behavior indicative of malware. For example, security device 220 may execute each file, in the additional group of files, sequentially or in parallel. Security device 220 may then monitor the testing environment, for a threshold amount of time, for behavior indicative of malware. Security device 220 may monitor the testing environment to determine whether the additional group of files includes malware (e.g., includes at least one file that is malware). In some implementations, security device 220 may identify multiple additional groups, and may analyze the multiple additional groups for malware concurrently (e.g., in parallel). In this way, security device 220 may reduce an amount of time needed to obtain a malware verdict for files.

As further shown in FIG. 8, if malware is not detected in the additional group (block 860—NO), process 800 may include indicating that the additional group of files does not include malware or modifying malware scores for the additional group of files (block 870), and returning to block 840. For example, if security device 220 determines that the additional group of files does not include malware (e.g., after monitoring the additional group of files for a threshold amount of time), then security device 220 may indicate that the additional group of files does not include malware. Additionally, or alternatively, security device 220 may prevent the additional group of files from undergoing an additional malware analysis. In some implementations, security device 220 may modify a group of malware scores corresponding to the additional group of files to reflect that the additional group of files does not include malware.

In some implementations, security device 220 may indicate that the additional group of files does not include malware by storing an indication (e.g., in a data structure) that the additional group of files does not include malware (e.g., that each file, included in the additional group of files, is not malware). Additionally, or alternatively, security device 220 may indicate, to another device, that the additional group of files does not include malware. Additionally, or alternatively, security device 220 may permit one or more client devices 220 to access files included in the additional group of files (e.g., based on an indication that the additional group of files does not include malware).

Additionally, or alternatively, security device 220 may modify a group of malware scores corresponding to the additional group of files. For example, security device 220 may generate and/or modify a malware score for a file that has not already been analyzed. As another example, security device 220 may modify a malware score for a file that has already been analyzed. In some implementations, security device 220 may set a malware score to indicate that the file is not malware. In some implementations, security device 220 may modify a malware score to indicate that the file is less likely to include malware (e.g., than indicated by a previous malware score for the file). For example, security device 220 may decrement a malware counter, may increment a non-malware counter, or the like.

Additionally, or alternatively, security device 220 may identify an additional group of files for the multi-file analysis (e.g., may return to block 840), and may analyze the additional group of files for malware, as described herein.

As further shown in FIG. 8, if malware is detected in the additional group (block 860—YES), then process 800 may include returning to block 810. For example, if security device 220 determines that the additional group of files includes malware (e.g., after monitoring the additional group of files for a threshold amount of time), then security device 220 may modify a group of malware scores corresponding to the additional group of files.

As an example, security device 220 may generate and/or modify a malware score for a file that has not already been analyzed. As another example, security device 220 may modify a malware score for a file that has already been analyzed. In some implementations, security device 220 may set a malware score to indicate that the file is more likely to be malware (e.g., as compared to a previous malware score for the file). For example, security device 220 may increment a malware counter, may decrement a non-malware counter, or the like.

Security device 220 may continue to select groups of files, analyze the groups of files for malware, modify malware scores, and individually analyze files associated with a malware score that satisfies a threshold. Thus, security device 220 may analyze files for malware as a group, may individually analyze files that are more likely to be malware (e.g., as indicated by a group analysis, multiple group analyses, etc.), and may not individually analyze files that are less likely to be malware (e.g., as indicated by a group analysis, multiple group analyses, etc.). In this way, security device 220 may conserve computing resources that would otherwise be expended if the files were analyzed individually.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
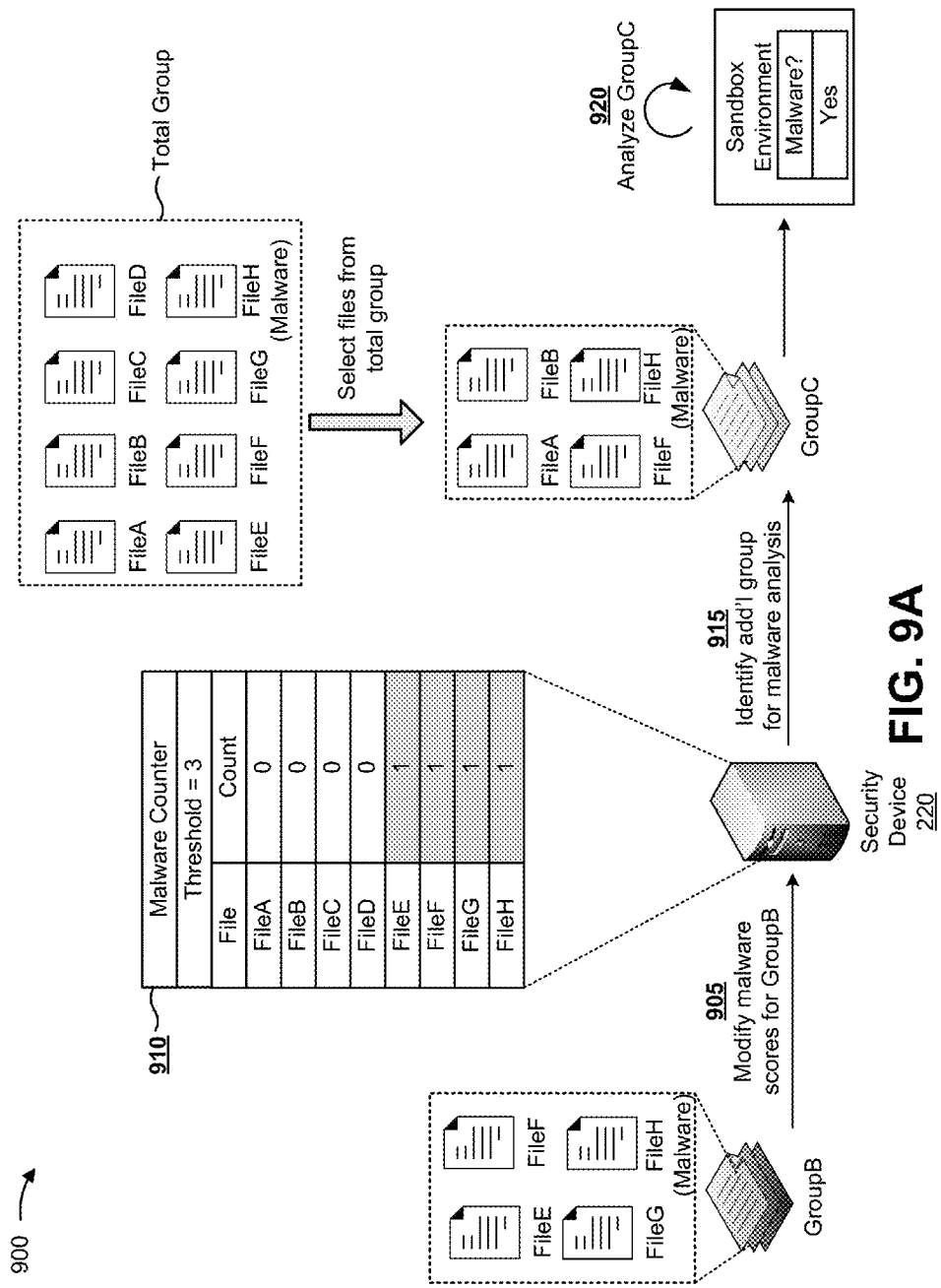
FIGS. 9A-9C are diagrams of an example implementation relating to the example process shown in FIG. 8.
Figure 9B:
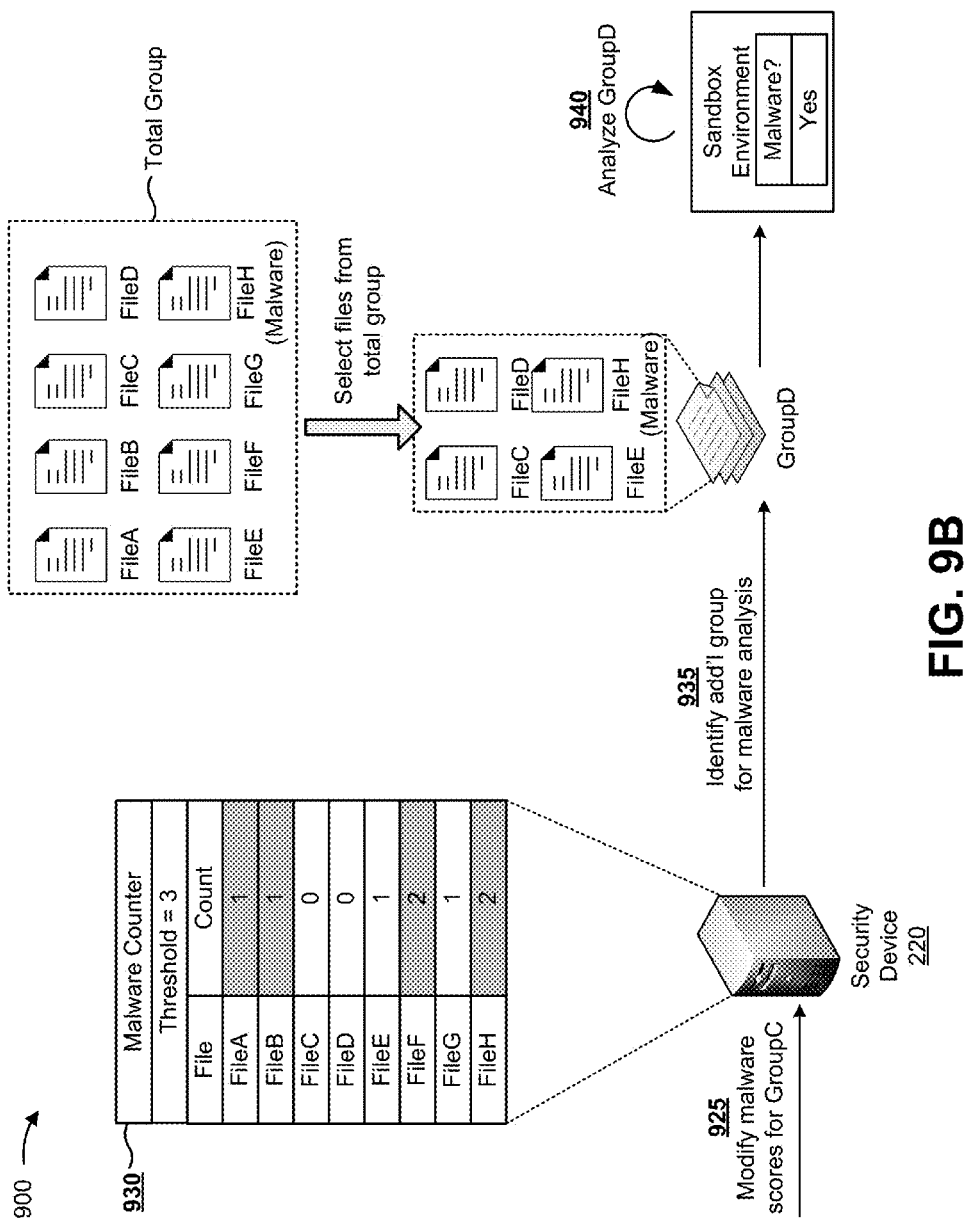
Figure 9C:
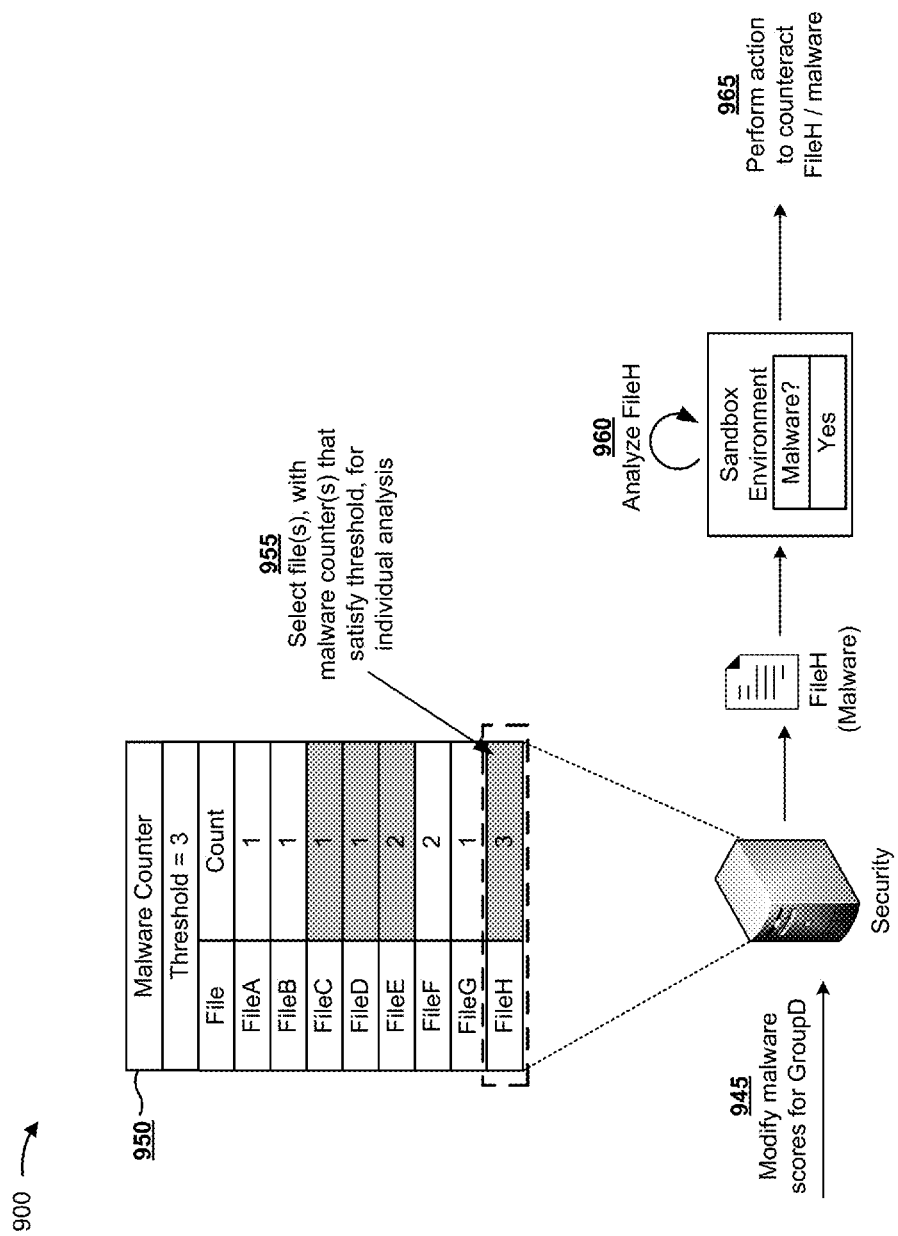

FIGS. 9A-9C are diagrams of an example implementation 900 relating to example process 800 shown in FIG. 8. FIGS. 9A-9C show an example of performing a malware analysis that modifies a group of malware scores, corresponding to a group of files, to identify a file that includes malware. For the purpose of FIGS. 9A-9C, assume that the operations described herein in connection with FIG. 5B have been performed. For example, assume that security device 220 has received a group of files identified as GroupB, and has determined that GroupB includes malware.

As shown in FIG. 9A, and by reference number 905, based on determining that GroupB includes malware, security device 220 may modify malware scores for the files included in GroupB, which includes FileE, FileF, FileG, and FileH. As shown by reference number 910, assume that security device 220 increments malware counters, associated with FileE, FileF, FileG, and FileH, to a value of one. Assume that malware counters associated with other files, in a total group of files to be analyzed, are set to zero (e.g., for FileA, FileB, FileC, and FileD). As further shown, security device 220 may store a threshold value (here, shown as three). When a malware counter for a file reaches the threshold value, security device 220 may analyze that file individually.

As shown by reference number 915, assume that security device 220 identifies an additional group of files, shown as GroupC, for a multi-file malware analysis. For example, assume that security device 220 includes FileA and FileB, which have not been previously analyzed, in the additional group, and includes FileF and FileH, which have been previously analyzed (e.g., with GroupB), in the additional group. As shown, assume that security device 220 selects these files from a total group of files that includes FileA, FileB, FileC, FileD, FileE, FileF, FileG, and FileH. As shown by reference number 920, assume that security device 220 analyzes GroupC in a sandbox environment, and determines that GroupC includes a file that is malware (e.g., because FileH, included in GroupC, is malware).

As shown in FIG. 9B, and by reference number 925, based on determining that GroupC includes malware, security device 220 may modify malware scores for the files included in GroupC, which includes FileA, FileB, FileF, and FileH. As shown by reference number 930, assume that security device 220 increments malware counters associated with FileA and FileB to a value of one, and increments malware counters associated with FileF and FileH to a value of two. Security device 220 may determine that none of the malware counters satisfy the threshold value of three, and may identify an additional group of files (shown as GroupD) for a malware analysis, as shown by reference number 935.

As shown, assume that security device 220 includes FileC and FileD, which have not been previously analyzed, in GroupD, and includes FileE and FileH, which have been previously analyzed, in GroupD. As shown by reference number 940, assume that security device 220 analyzes GroupD in a sandbox environment, and determines that GroupD includes a file that is malware (e.g., because FileH, included in GroupD, is malware).

As shown in FIG. 9C, and by reference number 945, based on determining that GroupD includes malware, security device 220 may modify malware scores for the files included in GroupD, which includes FileC, FileD, FileE, and FileH. As shown by reference number 950, assume that security device 220 increments malware counters associated with FileC and FileD to a value of one, increments a malware counter associated with FileE to a value of two, and increments a malware counter associated with FileH to a value of three. As shown by reference number 955, security device 220 may determine that the malware counter for FileH satisfies the threshold value of three (e.g., in this case, is equal to the threshold value), and may select FileH for an individual malware analysis.

As shown by reference number 960, assume that security device 220 analyzes FileH in a sandbox environment, and determines that FileH is malware. Based on this determination, and as shown by reference number 965, security device 220 may perform an action to counteract FileH, determined to be malware. For example, security device 220 may indicate that FileH is malware, may prevent client device(s) 210 from accessing FileH, may notify a device associated with an administrator that FileH is malware, or the like.

By performing a multi-file malware analysis for a group of files, such as using the scoring technique shown in FIGS. 9A-9C, security device 220 may conserve computing resources and time that would otherwise be expended if security device 220 individually analyzed each file included in the group of files.

As indicated above, FIGS. 9A-9C are provided merely as an example. Other examples are possible and may differ from what was described with regard to FIGS. 9A-9C.

Implementations described herein assist in accurately analyzing a group of files concurrently, rather than analyzing individual files separately, to identify individual files that include malware, thereby conserving computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
identify a plurality of files for a multi-file malware analysis;
execute the plurality of files in a malware testing environment;
monitor the malware testing environment for a behavior indicative of malware;
detect the behavior indicative of malware;
modify a plurality of malware scores, corresponding to the plurality of files, based on detecting the behavior indicative of malware;
determine that two or more malware scores, of the plurality of malware scores, satisfy a threshold;
partition the plurality of files into two or more segments of files based on determining that the two or more malware scores satisfy the threshold,
the two or more segments of files corresponding to the two or more malware scores;

analyze the two or more segments of files for malware;
determine that a segment of files, included in the two or more segments of files, includes malware based on analyzing the two or more segments of files; and
analyze at least one file, included in the segment of files, for malware based on determining that the segment of files includes malware.

2. The device of claim 1, where the one or more processors, when analyzing the two or more segments of files for malware, are to:
analyze the two or more segments of files separately; and
where the one or more processors are further to:
identify a particular segment of files, of the two or more segments of files, that includes malware based on analyzing the two or more segments of files separately; and
identify a file that includes malware based on identifying the particular segment of files that includes malware,
the file being included in the particular segment of files.

3. The device of claim 2, where the one or more processors, when analyzing the two or segments of files separately, are to:
analyze a first segment of files, of the two or more segments of files, using a first malware testing environment; and
analyze a second segment of files, of the two or more segments of files, using a second malware testing environment that is different from the first malware testing environment.

4. The device of claim 2, where the one or more processors, when analyzing the two or more segments of files separately, are to:
analyze a first segment of files, of the two or more segments of files, during a first time period; and
analyze a second segment of files, of the two or more segments of files, during a second time period that is different from the first time period.

5. The device of claim 1, where the one or more processors are further to:
determine that a malware score, of the plurality of malware scores, satisfies a threshold after modifying the plurality of malware scores;
identify a particular file associated with the malware score;
analyze the particular file for malware; and
identify a file that includes malware based on analyzing the particular file for malware,
the particular file and the file being a same file.

6. The device of claim 1, where the one or more processors are further to:
identify an additional plurality of files for the multi-file malware analysis,
the additional plurality of files including at least one file that is not included in the plurality of files;
analyze the additional plurality of files for malware concurrently;
modify an additional plurality of malware scores, corresponding to the additional plurality of files, based on analyzing the additional plurality of files;
determine that a malware score, of the plurality of malware scores or the additional plurality of malware scores, satisfies a particular threshold;
identify a particular file associated with the malware score;
analyze the particular file for malware; and
identify a file that includes malware based on analyzing the particular file for malware,
the particular file and the file being a same file.

7. The device of claim 1, where the one or more processors, when modifying the plurality of malware scores, are to:
increment a plurality of malware counters, corresponding to the plurality of files, based on detecting the behavior indicative of malware,
the plurality of malware counters being used for the plurality of malware scores.

8. A non-transitory computer-readable medium storing instructions, the instructions comprising:
one or more instructions that, when executed by one or more processors, cause the one or more processors to:
identify a group of files for a multi-file malware analysis;
execute the group of files concurrently in a testing environment;
monitor the testing environment for a behavior indicative of malware;
detect, based on monitoring the testing environment, the behavior indicative of malware;
modify a group of malware scores, corresponding to the group of files, based on detecting the behavior indicative of malware;
determine that two or more malware scores, of the group of malware scores, satisfy a threshold;
partition the group of files into two or more segments of files based on determining that the two or more malware scores satisfy the threshold,
the two or more segments of files corresponding to the two or more malware scores;
analyze the two or more segments of files, separately, for malware;
determine that a segment of files, included in the two or more segments of files, includes malware based on analyzing the two or more segments of files; and
analyze at least one file, included in the segment of files, for malware based on determining that the segment of files includes malware.

9. The non-transitory computer-readable medium of claim 8, where the one or more instructions, when executed by the one or more processors, cause the one or more processors to:
determine that the segment of files comprises a single file; and
where the one or more instructions, that cause the one or more processors to analyze the at least one file, further cause the one or more processors to:
analyze the single file for malware based on determining that the segment of files comprises the single file.

10. The non-transitory computer-readable medium of claim 8, where the one or more instructions, when executed by the one or more processors, further cause the one or more processors to:
determine that the segment of files includes multiple files;
partition the segment of files into two or more additional segments of files based on determining that the segment of files includes multiple files;
analyze the two or more additional segments of files for malware;
determine that another segment of files, included in the two or more additional segments of files, includes malware based on analyzing the two or more additional segments of files; and where the one or more instructions, that cause the one or more processors to analyze the at least one file, cause the one or more processors to:
analyze the at least one file based on determining that the other segment of files includes malware,
the at least one file being included in the other segment of files.

11. The non-transitory computer-readable medium of claim 8, where the one or more instructions, when executed by the one or more processors, further cause the one or more processors to:
determine a size for the segment of files based on a likelihood that a file, of the segment of files, includes malware when the segment is the size; and
where the one or more instructions, that cause the one or more processors to partition the group of files into two or more segments of files, cause the one or more processors to:
form the segment of files having the size.

12. The non-transitory computer-readable medium of claim 8, where the one or more instructions, that cause the one or more processors to analyze the two or more segments of files separately, cause the one or more processors to:
analyze the two or more segments of files using different malware analysis sessions.

13. The non-transitory computer-readable medium of claim 8, where the segment of files is a first segment of files;
where the one or more instructions, when executed by the one or more processors, further cause the one or more processors to:
determine that a second segment of files, included in the two or more segments of files, does not include malware based on analyzing the two or more segments of files;
and
prevent the second segment of files from undergoing further malware analysis based on determining that the second segment of files does not include malware.

14. The non-transitory computer-readable medium of claim 8, where the one or more instructions, that cause the one or more processors to modify a group of malware scores, cause the one or more processors to:
increment a group of malware counters, corresponding to the group of files, based on detecting the behavior indicative of malware,
the group of malware counters being used for the group of malware scores.

15. A method, comprising:
identifying, by a device, a group of files for a multi-file malware analysis;
executing, by the device, the group of files concurrently in a testing environment;
monitoring, by the device, the testing environment for a behavior indicative of malware;
detecting, by the device and based on monitoring the testing environment, the behavior indicative of malware;
modifying, by the device, a group of malware scores, corresponding to the group of files, based on detecting the behavior indicative of malware;
determining, by the device, that two or more malware scores, of the group of malware scores, satisfy a threshold;
partitioning, by the device, the group of files into two or more segments of files based on determining that the two or more malware scores satisfy the threshold, the two or more segments of files corresponding to the two or more malware scores;
and
analyzing, by the device, the two or more segments of files for malware.

16. The method of claim 15, where modifying the group of malware scores comprises:
incrementing a group of malware counters, corresponding to the group of files, based on detecting the behavior indicative of malware,
the group of malware counters being used for the group of malware scores.

17. The method of claim 15, where the malware score for each file of the group of files is based on a quantity of times that each file of the group of files is included in a multi-file group that tests positive for malware.

18. The method of claim 15, further comprising:
identifying an additional group of files;
analyzing the additional group of files for malware;
modifying an additional group of malware scores, corresponding to the additional group of files, based on analyzing the additional group of files; and
where determining that the two or more malware scores satisfy the threshold comprises:
determining that the two or more malware scores satisfy the threshold based on modifying the additional group of malware scores.

19. The method of claim 15, further comprising:
determining that a set of malware scores, of the group of malware scores, satisfies the threshold;
partitioning a set of files, of the group of files, into two or more segments of files based on determining that the set of malware scores satisfies the threshold, the set of files corresponding to the set of malware scores; and
where analyzing the two or more segments of files for malware comprises:
analyzing the two or more segments of files for malware based on partitioning the set of files into two or more segments of files.

20. The method of claim 15, further comprising:
selecting an additional group of files from a total group of files that includes the group of files,
the additional group of files including at least one file not included in the group of files;
analyzing the additional group of files for malware;
modifying an additional group of malware scores, corresponding to the additional group of files, based on analyzing the additional group of files;
and where determining that the two or more malware scores satisfy the threshold comprises:
determining that the two or more malware scores satisfy the threshold based on modifying the additional group of malware scores.

* * * * *